Patented July 16, 1946

UNITED STATES PATENT OFFICE 2,404,313

COATED FABRIC

Ernest A. Rodman, Newburgh, N. Y., assignor to E. I. du Pont de Nemours & Company, Wilmington, Del., a corporation of Delaware No Drawing. Application January 9, 1943, Serial No. 471,873

1 Claim. (Cl. 117—161)

This invention relates to coating compositions and particularly to specially plasticized vinyl resin coating compositions and fabrics coated with such compositions, particularly those for outdoor use.

At present there are relatively few commercially available plasticizers which are completely satisfactory for vinyl resin resulting from the conjoint polymerization of vinyl chloride and vinyl acetate. The plasticizers usually employed for such vinyl resins include the aryl phosphates such as, e. g., tricresyl phosphate and the alkyl phthalates, such as, e. g., dibutyl phthalate. Certain castor oil derivatives such as methoxy ethyl acetyl ricinoleate and butyl acetyl ricinoleate have been used as plasticizers for the vinyl resins mentioned above. These plasticizers do not yield films having flexibility at very low temperatures and resistance to the sweating out of the plasticizer on aging at normal temperatures. Another requisite of the plasticized vinyl resin composition for fabric coatings is the resistance to the development of tackiness at elevated temperatures. The use as plasticizers of certain esters of long chain aliphatic dicarboxylic acids, such as alkoxy-alkyl esters of linoleic, euric, stearic, and palmitic acids are also open to such objections.

The prior art plasticizers are considered generally satisfactory for plasticizing molding compositions. If a flexible vinyl resin coating is desired, the general practice is to increase the quantity of plasticizer present. In the case of fabric coatings, it is not possible to produce vinyl resin coatings of extreme flexibility without encountering stickiness of the coating at elevated temperature which results from the solvent action of the plasticizers normally employed. The objection to tackiness at elevated temperatures of the vinyl resin coatings has been overcome to a certain extent by incorporating a small portion of wax in the coating composition. For certain uses of coated fabrics where the coating is to be laminated to another surface, the presence of a wax in the coating results in a somewhat greasy surface which prevents the forming of a satisfactory bond.

A primary object of this invention is to provide a plasticized vinyl chloride-vinyl acetate resin composition which is resistant to the development of tackiness at elevated temperatures and retains its flexibility at low temperatures.

A further object is the provision of a plasticized vinyl resin composition which does not require the presence of a waxy material to prevent the development of tackiness at elevated temperatures.

A still further object is the preparation of a plasticized vinyl resin composition in which the plasticizer does not sweat out at normal temperatures upon storage.

A still further object is the preparation of a coating composition suitable for spreading on textile fabrics.

A still further object is the preparation of a coated fabric having improved quality with respect to flexibility, resistance to sweating of the plasticizer at normal temperature and resistance to the development of tackiness at elevated temperature.

Other objects will be apparent to those skilled in the art as the description of the invention proceeds.

These objectives are accomplished according to the present invention by preparing a coating composition comprising a vinyl resin prepared by the conjoint polymerization of vinyl chloride and vinyl acetate and as a plasticizer, an alkyl ether alcohol ester of an aliphatic dicarboxylic acid having 4 to 9 carbon atoms in the straight chain.

The following examples are given by way of illustration and not limitation.

A preferred plasticizer employed in practicing this invention is the azelaic di-ester of monobutyl ether of ethylene glycol which may be prepared by charging 202 parts of azelaic acid and 354 parts of monobutyl ether of ethylene glycol along with one part of an esterification catalyst such as, sulphuric acid, into a reaction vessel capable of being heated to 200° C. The reaction ingredients are brought to a temperature of 175° C. Water as formed during the reaction is removed continuously along with some of the ether alcohol with which it forms an azeotropic mixture. After the reaction is substantially complete and all of the azelaic acid is essentially esterified, the product is freed from the excess ether alcohol by distillation. The catalyst and any other unreacted acidic materials are removed by treatment in the cold with an alkaline material such as, e. g., lime, sodium carbonate, and sodium bicarbonate, etc., after which the neutralized acidic materials and excess alkaline reagents are washed from the ester by treatment with water. Final traces of volatile impurities are removed from the ester by steam distillation, preferably under reduced pressure. After all traces of the volatile impurities have been removed, the steaming is discontinued, the ester is heated under reduced pressure to render it anhydrous. The ester may be further purified by treatment with an absorbent decolorizing material such as, e. g., absorbent clay or activated carbon after which the ester is filtered to remove the absorbent materials, together with the impurities. Although the product at this stage is generally satisfactory for the purposes of this invention, it can be still further purified by distilling preferably under reduced pressure during which undesirable fractions can be removed and discarded. The ester is now ready to be blended with a solution of the vinyl resin described more fully hereinafter.

A similar plasticizer may be prepared in a like manner by using a reactive equivalent of suberic acid in place of azelaic acid.

A fabric is coated with the improved compositions of this invention by means well known in the coating art such as, e. g., spray coating, calender coating, roller coating, doctor knife coating and by passing the fabric through the composition and pressing out the excess coating composition. The fabric may be coated on one or both sides depending upon the use for which the material is intended. A suitable apparatus for applying the coating composition is described in U. S. Patent No. 2,107,276 which was issued to W. T. Anderson, February 8, 1938. After the coating composition has been applied, it is dried by any suitable means, such as, festooning in a heated drying chamber, or passing through a suitably heated drying chamber, such as that described in U. S. Patent No. 2,107,275 which issued February 8, 1938, to Anderson et al. The drying means, time and temperature may be conveniently regulated to suit particular equipment used and other general manufacturing conditions.

The following specific examples in which the parts are by weight further illustrate the invention. The numbers in parenthesis indicate the percentages of non-volatile ingredients after the volatile components have been expelled.

Example I

| | Per cent |
|---|---|
| Copolymer of vinyl chloride and vinyl acetate in the ratio of approximately 90 parts vinyl chloride and approximately 10 parts vinyl acetate | 10.1 (39.30) |
| Azelaic di-ester of monobutyl ether of ethylene glycol | 5.7 (22.18) |
| Pigments | 9.8 (38.13) |
| Stabilizer for vinyl resin | .1 (.39) |
| Methyl ethyl ketone | 74.3 |

The vinyl resin copolymer in the above formulation may be prepared in the manner described in U. S. Patent No. 1,935,577 to E. W. Reid, November 14, 1933.

The above composition was prepared by first grinding or dispersing the pigment in the azelaic di-ester of monobutyl ether of ethylene glycol by passing the pigment and the plasticizer between high speed rollers under pressure. The vinyl resin was dissolved in methyl ethyl ketone in a closed jacketed kettle fitted with a reflux condenser in which the temperature of the solvent and resin was maintained at 75° C. and subjected to a stirring operation for approximately four hours. If the resin solution is allowed to cool to room temperature, a stiff gel is formed which is broken upon reheating. While the resin solution was in a fluid state (heated to about 75° C.), the azelaic di-ester of monobutyl ether of ethylene glycol-pigment mixture was added to the heated resin solution and the mixing continued to disperse the plasticizer-pigment mixture thoroughly. A small percentage of a stabilizer for the vinyl resin may be added such as, e. g., phenoxy propylene oxide, calcium stearate, lead carbonate, litharge, etc. which prevents thermal decomposition or color change of the vinyl resin.

While the plasticized, pigmented resin solution was hot (50–75° C.), it was applied to a light weight textile fabric running 3.69 yards per pound per 39" width. A plurality of coats of the above composition was applied to the textile fabric and the coated fabric was passed through a heated chamber to expel the methyl ethyl ketone between each successive coat. The amount of composition which may be applied may vary from one coat to several coats depending upon the intended use of the coated fabric. The dried coated fabric may be further treated by embossing the coating by pressing the material between heated embossing rolls, one of which is steel and has a design engraved thereon.

A coated fabric prepared as described above and having approximately 4 ounces of dry coating per square yard has properties which make it particularly useful for men's raincoats. The coating on the fabric is resistant to cracking at temperatures as low as −50° C. The plasticizer will not sweat from the coating upon prolonged storage at normal temperature and the material will not become tacky at a temperature of 105° C.

Example II

The following composition was employed in the same manner as described in Example I in preparing a hospital sheeting:

| | Per cent |
|---|---|
| Copolymer of vinyl chloride and vinyl acetate in the ratio of approximately 95 parts of vinyl chloride and approximately 5 parts of the acetate | 10.33 (43.26) |
| Azelaic di-ester of monobutyl ether of ethylene glycol | 6.45 (26.93) |
| Pigment | 7.04 (29.48) |
| Phenoxy propylene oxide | .08 (0.33) |
| Methyl ethyl ketone | 76.12 |

Sufficient coats of the above composition were applied on each side of a cotton fabric running 2.50 yards per pound per 60" width to deposit approximately three ounces of non-volatile components on each side of the fabric per yard per 60" width. The material has the appearance of rubber-coated fabric and was entirely satisfactory for the purposes intended.

Similar compositions may be made using a pimelic di-ester in place of the azelaic di-ester.

Example III

The following composition may be employed in the same manner as described in Example I to prepare an upholstery material:

| | Per cent |
|---|---|
| Copolymer of vinyl chloride and vinyl acetate in the ratio of approximately 95 parts vinyl chloride and approximately 5 parts vinyl acetate | 8.93 (24.8) |
| Suberic di-ester of the monobutyl ether of ethylene glycol | 8.93 (24.8) |
| Pigment | 18.00 (50.0) |
| Methyl ethyl ketone | 64.00 |
| Phenoxy propylene oxide | .14 (.4) |

The vinyl resin in the above example is the same as that disclosed in Example I. Sufficient coats of the above composition were applied to deposit approximately 14 ounces of non-volatile ingredients per yard on a sateen woven cotton fabric running 1.12 yards per pound per 53" width. A suitable design was embossed in the coating by passing between conventional embossing rollers. The material was satisfactory for the purposes intended.

Example IV

A double texture coated fabric suitable for forming military cases such as e. g., medical kits, tool kits, etc. was prepared as follows:

A sateen woven fabric running 1.12 yards per pound per 53" width was given a plurality of coats of the following composition:

| | Per cent |
|---|---|
| Polyvinyl alcohol butyraldehyde resin [1] | 19.71 (37.47) |
| Ethyl alcohol | 47.41 |
| Castor oil | 29.02 (55.18) |
| Pigment | 3.86 (7.35) |

[1] The polyvinyl butyraldehyde resin may be prepared in accordance with U. S. Patent 2,162,678.

Sufficient coats of the above composition were spread on the sateen fabric to deposit approximately 4 ounces per yard per 50" width of non-volatile components and the solvent was expelled after each successive coat. The coating had a slight tack under pressure, but could be rolled up in a bale.

A sheeting fabric running 2.50 yards per pound per 60" width was coated in a like manner with an equal amount of the same composition. The two fabrics were then passed through a doubler and another light coat of the above composition was applied just prior to bringing the coated sides of the two fabrics in contact with each other. Sufficient pressure was applied to form a firm bond between the two fabrics and the volatile solvent was expelled by passing through a heated chamber.

The uncoated side of the sheeting was then given a plurality of coats of the following composition:

| | Per cent |
|---|---|
| Copolymer of vinyl acetate and vinyl chloride in the ratio of approximately 95 parts of vinyl chloride 5 parts vinyl acetate [2] | 10.27 (42.34) |
| Azelaic di-ester of monobutyl ether of ethylene glycol | 5.98 (24.65) |
| Pigment | 7.91 (32.60) |
| Phenoxy propylene oxide | .10 (.41) |
| Methyl ethyl ketone | 75.74 |

[2] This resin may be prepared in the same manner as disclosed in Example I.

Sufficient coats of the above composition were applied to the uncoated sheeting side of the laminated fabrics to deposit approximately three ounces of the non-volatile components. The solvent was expelled after each successive coat by passing through a heated chamber. The material was entirely satisfactory for the purposes intended.

Example V

| | Per cent |
|---|---|
| Copolymer of vinyl chloride and vinyl acetate in the ratio of approximately 90 parts vinyl chloride and 10 parts vinyl acetate [3] | 10.94 (55.5) |
| Glutaric di-ester of monobutyl ether of diethylene glycol | 3.28 (16.7) |
| Pigments | 5.47 (27.8) |
| Methyl ethyl ketone | 80.31 |

[3] This resin may be prepared in the same manner as disclosed in Example I.

A composition suitable for coating was prepared by dispersing the copolymer, plasticizer, and pigments in methyl ethyl ketone as described in Example I. A fabric was coated with the jelly by the procedure described in Example III. The material was satisfactory for the purposes intended.

In the foregoing description of the preparation of the preferred plasticizer, pimelic, glutaric, suberic and azelaic acids are disclosed. Other aliphatic dicarboxylic acids having 4–9 carbon atoms in the straight chain may be used in preparing the plasticizers for the purposes of the invention, including adipic, succinic, and tartaric. It is also within the scope of this invention to use dicarboxylic acids having 4–9 carbon atoms in the straight chain and with an alkyl or aryl side chain.

Ether alcohols other than the butyl ether of ethylene glycol which may be reacted with the aliphatic dicarboxylic acids, having 4–9 carbon atoms in the straight chain in preparing plasticizers for the purposes of this invention, include the following:

- Methyl ether of ethylene glycol
- Ethyl ether of ethylene glycol
- Propyl ether of ethylene glycol
- Methyl ether of diethylene glycol
- Ethyl ether of diethylene glycol
- Butyl ether of diethylene glycol
- Propyl ether of diethylene glycol
- Methyl ether of propylene glycol
- Ethyl ether of propylene glycol
- Butyl ether of propylene glycol
- Propyl ether of propylene glycol In the foregoing examples the vinyl resin copolymers disclosed contain the equivalent to approximately 95% to 90% vinyl chloride. It is within the scope of this invention to use vinyl resins having a greater or lesser equivalent vinyl chloride. As mentioned above, the component of the copolymer other than the vinyl chloride should be vinyl acetate. Diethyl fumarate, or other fumaric esters, such as, e. g. methyl and propyl are not the equivalent of vinyl chloride-vinyl acetate in this invention.

In the examples the ratio of copolymer resin to plasticizer varies between 1 part of resin to 0.3 parts of plasticizer and 1 part of resin to 1 part of plasticizer. Compositions having a higher ratio of plasticizer to resin do not have the resistance to the development of tackiness of the preferred material of this invention. However, for certain uses where the plasticized vinyl resin compositions are not to be subjected to elevated temperatures, the higher ratios of plasticizer to resin may be satisfactorily used. Likewise where much suppleness is not desired a lower ratio of plasticizer to resin than that shown in the examples may be used.

While the invention has been described with reference to coated fabrics, it may also find other uses in the field of coating compositions where flexible coatings and films are desired. For some uses paper may be coated.

The products of this invention can be used wherever coated fabrics have been used in the past, e. g., pocketbooks, camera bellows, upholstery, bookbinding, tablecloths, window shades, printer's blanket and draw sheet for rotary printing cylinders, footwear, and cleanable adhesive tape backing.

The primary advantage of this invention is the provision of a high quality coated fabric which is exceptionally resistant to wear and extreme outdoor climatic conditions and retains its original flexibility at low temperatures and does not become tacky at room temperatures. A further advantage is that the plasticizer in the coating does not sweat out at normal temperatures upon aging. The coated fabrics have been found suitable for use as raincoat material in place of rubber coated fabrics.

It is apparent that many widely and different embodiments of this invention may be made without departing from the spirit and scope thereof, and therefore, it is not intended to be limited except as indicated in the appended claim.

I claim:

A coated fabric suitable for the manufacture of raincoats and the like comprising a light weight textile fabric having approximately six ounces per square yard of the following approximate composition adhered to at least one side of said fabric:

| | Percent |
|---|---|
| Copolymer of vinyl chloride and vinyl acetate in the ratio of approximately 90 parts vinyl chloride and approximately 10 parts vinyl acetate | 39.30 |
| Azelaic di-ester of monobutyl ether of ethylene glycol | 22.18 |
| Pigments | 39.13 |
| Stabilizer for vinyl resin | .39 |

ERNEST A. RODMAN.

Certificate of Correction

Patent No. 2,404,313.

July 16, 1946.

ERNEST A. RODMAN

It is hereby certified that error appears in the printed specification of the above numbered patent requiring correction as follows: Column 8, line 12, for the numeral "39.13" read *38.13*; and that the said Letters Patent should be read with this correction therein that the same may conform to the record of the case in the Patent Office.

Signed and sealed this 17th day of September, A. D. 1946.

[SEAL]

LESLIE FRAZER,
*First Assistant Commissioner of Patents.* is exceptionally resistant to wear and extreme outdoor climatic conditions and retains its original flexibility at low temperatures and does not become tacky at room temperatures. A further advantage is that the plasticizer in the coating does not sweat out at normal temperatures upon aging. The coated fabrics have been found suitable for use as raincoat material in place of rubber coated fabrics.

It is apparent that many widely and different embodiments of this invention may be made without departing from the spirit and scope thereof, and therefore, it is not intended to be limited except as indicated in the appended claim.

I claim:
A coated fabric suitable for the manufacture of raincoats and the like comprising a light weight textile fabric having approximately six ounces per square yard of the following approximate composition adhered to at least one side of said fabric:

| | Percent |
|---|---|
| Copolymer of vinyl chloride and vinyl acetate in the ratio of approximately 90 parts vinyl chloride and approximately 10 parts vinyl acetate | 39.30 |
| Azelaic di-ester of monobutyl ether of ethylene glycol | 22.18 |
| Pigments | 39.13 |
| Stabilizer for vinyl resin | .39 |

ERNEST A. RODMAN.

Certificate of Correction

Patent No. 2,404,313.

July 16, 1946.

ERNEST A. RODMAN

It is hereby certified that error appears in the printed specification of the above numbered patent requiring correction as follows: Column 8, line 12, for the numeral "39.13" read *38.13*; and that the said Letters Patent should be read with this correction therein that the same may conform to the record of the case in the Patent Office.

Signed and sealed this 17th day of September, A. D. 1946.

[SEAL]

LESLIE FRAZER,
*First Assistant Commissioner of Patents.*